United States Patent [19]
Corfitsen

[11] Patent Number: 5,671,786
[45] Date of Patent: Sep. 30, 1997

[54] APPARATUS FOR AUTOMATIC REFUELING OF VEHICLES

[76] Inventor: Sten Corfitsen, Rödjursvägen 1, S-181 43, Lidingo, Sweden

[21] Appl. No.: 392,917
[22] PCT Filed: Sep. 3, 1993
[86] PCT No.: PCT/SE93/00718
   § 371 Date: Mar. 3, 1995
   § 102(e) Date: Mar. 3, 1995
[87] PCT Pub. No.: WO94/06031
   PCT Pub. Date: Mar. 17, 1994

[30] Foreign Application Priority Data

Sep. 4, 1992 [SE] Sweden ................... 9202550

[51] Int. Cl.$^6$ .................. G01S 13/74; B67D 5/08; B60S 5/02
[52] U.S. Cl. ................ 141/94; 141/98; 141/383; 141/231; 141/284; 901/6; 901/16; 901/40; 901/46; 342/42; 342/140
[58] Field of Search ............... 141/94, 98, 198, 141/231, 232, 284, 351–355, 360–362, 383, 386; 901/6, 16, 41, 45, 46, 40; 343/42, 140

[56] References Cited

U.S. PATENT DOCUMENTS

| | | | |
|---|---|---|---|
| 3,527,268 | 9/1970 | Ginsburgh | 141/98 |
| 3,536,109 | 10/1970 | Ginsburgh et al. | 141/98 |
| 3,642,036 | 2/1972 | Ginsburgh et al. | 141/94 |
| 4,728,955 | 3/1988 | Hane | 342/140 |
| 4,846,233 | 7/1989 | Fockens | 141/94 |

FOREIGN PATENT DOCUMENTS

| | | | |
|---|---|---|---|
| 0418744 | 3/1991 | European Pat. Off. | 141/231 |
| 2600318 | 12/1987 | France . | |
| 90/13512 | 11/1990 | WIPO . | |
| 91/17111 | 11/1991 | WIPO . | |

*Primary Examiner*—J. Casimer Jacyna
*Attorney, Agent, or Firm*—Nies, Kurz, Bergert & Tamburro

[57] ABSTRACT

Apparatus for the automatic fuelling of vehicles. A robot head that carries a fuel filler tube is movable to enable it to be brought into position to engage with a vehicle fuel-tank pipe. The robot head carries an opening device for opening a fuel-tank cover plate of a vehicle. The positioning of the robot head is effected by a positioning system that includes a transceiver unit carried by the robot head and that preferably operates at microwave frequency. A passive transponder is carried by the vehicle and includes a simple code which the transponder is intended to modulate on a signal transmitted by the transceiver and is reflected by the transponder. The signal received by the transceiver from the transponder is decoded and is used to access a robot head movement plan that corresponds with that code, to automatically steer the robot head to the fuel tank pipe and thereby enable the vehicle to be fuelled.

5 Claims, 2 Drawing Sheets

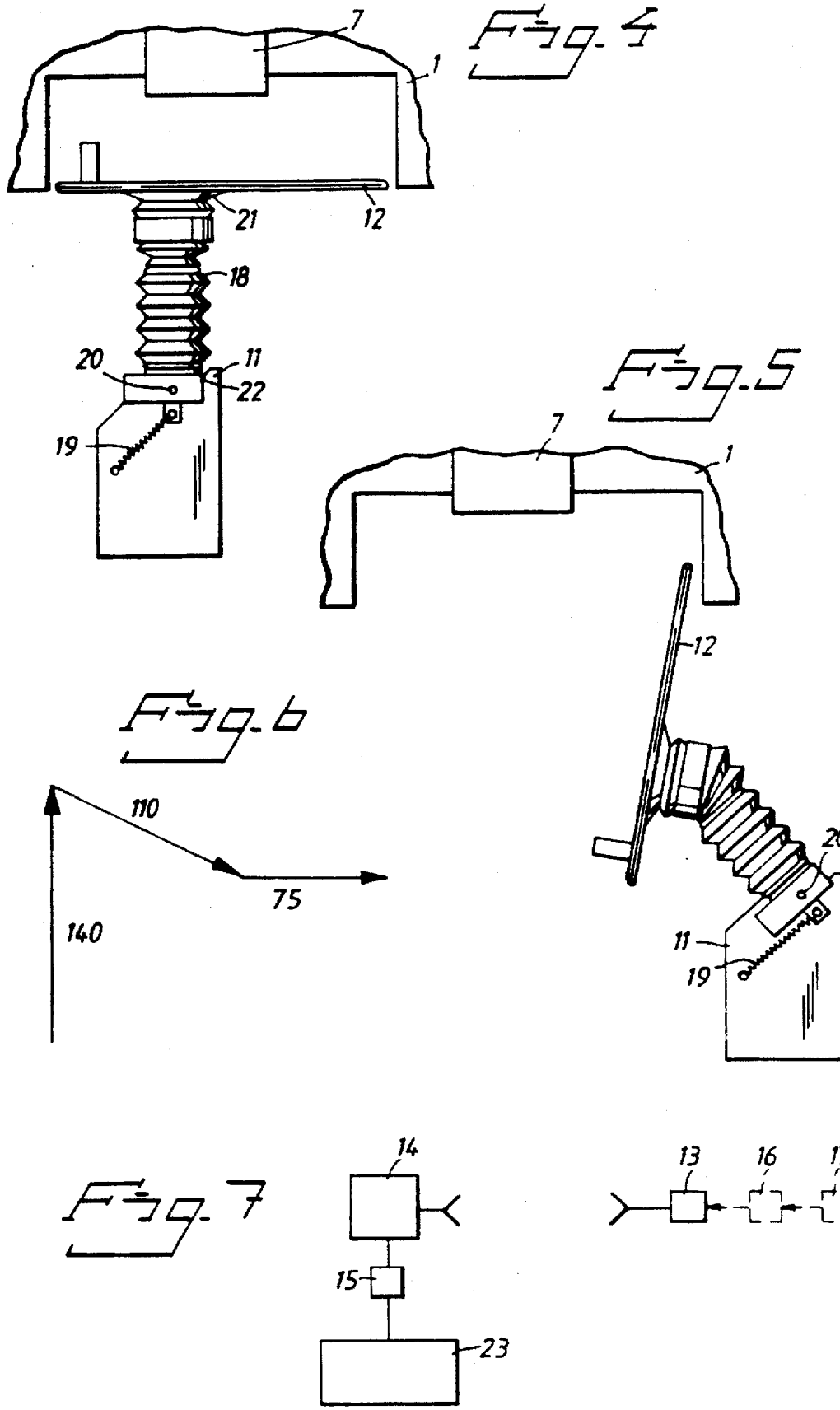

APPARATUS FOR AUTOMATIC REFUELING OF VEHICLES

BACKGROUND OF THE INVENTION

1. Field of the Invention

The present invention relates to apparatus for automatic refuelling of vehicles, primarily cars.

2. Description of the Related Art

An apparatus by means of which cars are fuelled automatically is described in Swedish Patent Specification No. 8901674-5. The apparatus according to that publication comprises a robot which includes a fuelling nozzle or corresponding device and which when the vehicle is placed in a predetermined position in relation to the robot is intended to move the fuelling nozzle automatically from a rest position to a vehicle fuelling position in response to sensing and control means. The fuelling nozzle includes a rigid first tubular element or tube which is intended to be moved by the robot towards an adapter provided with a hole which belongs to the vehicle fuelling location. A flexible, second tube is arranged for movement within the first, rigid tube from a first end position in which the outer free end of the second tube is located within the first tube, to a second end position in which the second tube projects out from the first tube. A tube connection is provided between said hole and the vehicle fuel-tank pipe. The robot is constructed to move the free end of the second tube out of the first tube and down into said tube connection, or down into the vehicle fuel-tank pipe, and pump fuel through the second tube down into the tank of the vehicle.

Swedish Patent Specification No. 9001575-1 describes a method of opening and closing a vehicle fuelling flap which lies flush with the vehicle chassis and which can be swung between an open and a closed position around a vertical or horizontal axis and which covers the space in which the inlet orifice of the fuel-tank pipe is located. According to that patent publication, the flap, or cover plate, is opened in two stages and different opening means are used in each of said stages.

One problem is that a large number of mutually different fuel-tank flaps exist and that these flaps are positioned in mutually different places. The problem is that it is necessary for the robot head to perform many different movements when a flap opening device is maneuvered by means of robot head movement.

According to the last-mentioned patent publication, a vehicle-mounted transponder which coacts with a transceiver unit fitted to the robot head contains information relating to the particular pattern of movement that is to be carried out by the robot head in the case of the vehicle concerned at that time. The transceiver unit also coacts with the transponder to initially position the robot head in relation to the vehicle.

It is desired to simplify the opening process and to render those parts of an automatic fuelling system that are fitted to the vehicle less expensive.

These desiderata are fulfilled by the present invention.

SUMMARY OF THE INVENTION

Thus, the present invention relates to an apparatus for the automatic fuelling of vehicles, primarily cars, including a robot which has a robot head that is movable relative to the robot so as to enable it to be brought to a predetermined position in relation to the vehicle fuel-tank pipe. The positioning of the robot head is effected by means of a positioning system which includes a transceiver unit that is mounted adjacent the robot head, said unit preferably being constructed to operate at microwave frequency, and a passive transponder which is placed in a predetermined position on the vehicle. The robot head includes an outer tube and an inner tube which is housed within said outer tube and movable out of said tube, wherein the outer tube is intended to be docked with an adapter which is attached to the upper orifice of the fuel-tank pipe. Subsequent to docking said outer tube, the free forward end of the inner tube is intended to be projected to a position down in the fuel-tank pipe, whereafter fuel is delivered through the inner tube. The robot head carries a flap opening device which functions to open a fuel-tank flap of a vehicle in response to movements of the robot head. The invention includes a plurality of different transponders, of which only one is carried by a vehicle. Each of said transponders is provided with a simple code which the transponder is intended to modulate on a signal transmitted by the transceiver unit and reflected by the transponder; and it further includes a decoder which decodes the code from the signal received by the transceiver unit from the transponder and delivers the code to a computer connected to the robot. The computer includes a memory in which a specific movement plan is stored for each code, and the computer is constructed to steer the robot head in the movement plan defined by the received code upon the receipt of said code.

BRIEF DESCRIPTION OF THE DRAWINGS

The invention will now be described in more detail, partially with reference to exemplifying embodiments thereof shown in the attached drawings in which:

FIG. 4 is a schematic illustration of a closed fuel-tank flap and a flap opening device;

FIG. 5 illustrates schematically a fuel-tank flap that has been opened by means of the flap opening device;

FIG. 6 is a vector diagram illustrating movement of the robot head when opening the tank flap; and FIG. 7 is a block schematic which illustrates a transceiver unit and a transponder.

DESCRIPTION OF THE PREFERRED EMBODIMENTS

Figure 1:
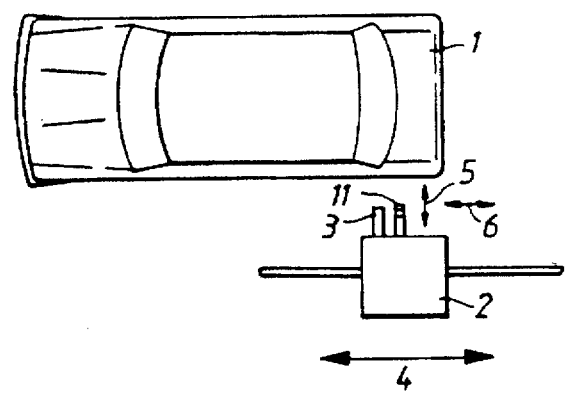
FIG. 1 is a schematic view from above of a vehicle parked adjacent a robot of the kind concerned here.

FIG. 1 illustrates schematically a filling station in which vehicles, primarily cars 1, are refuelled automatically and which includes a robot 2 having a robot head 3 which is movable relative to the robot so as to enable the robot head to be brought to a predetermined position in relation to the fuel-tank pipe of the vehicle. The robot may be movable in the direction of the arrow 4 and the robot head 3 is movable in the direction of the arrows 5 and 6 and also in a direction perpendicular to the plane of the paper.

Figure 2:
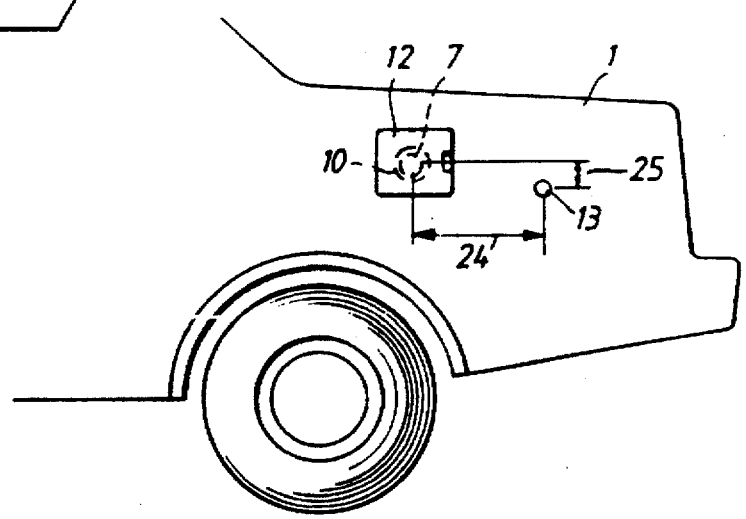
FIG. 2 illustrates the rear of the vehicle from one side thereof.

The robot head 3 is positioned relative to the fuel-tank pipe 7 (see FIG. 2) by means of a positioning system which includes a transceiver unit mounted adjacent the robot head, said transceiver unit preferably being constructed to operate at microwave frequency, and a passive transponder 13 which is mounted at a predetermined location on the vehicle 1.

There is preferably used a positioning system of the kind described in Swedish Patent Specification No. 8403564-1. By passive transponder is meant a transponder which receives a signal from the transceiver unit and retransmits the signal without adding further energy thereto, i.e., it reflects the signal.

By predetermined location or position of the transponder 13 is meant a position which is spaced at a given horizontal distance 24 and a given vertical distance 25 relative to the fuel-tank pipe 7.

Figure 3:
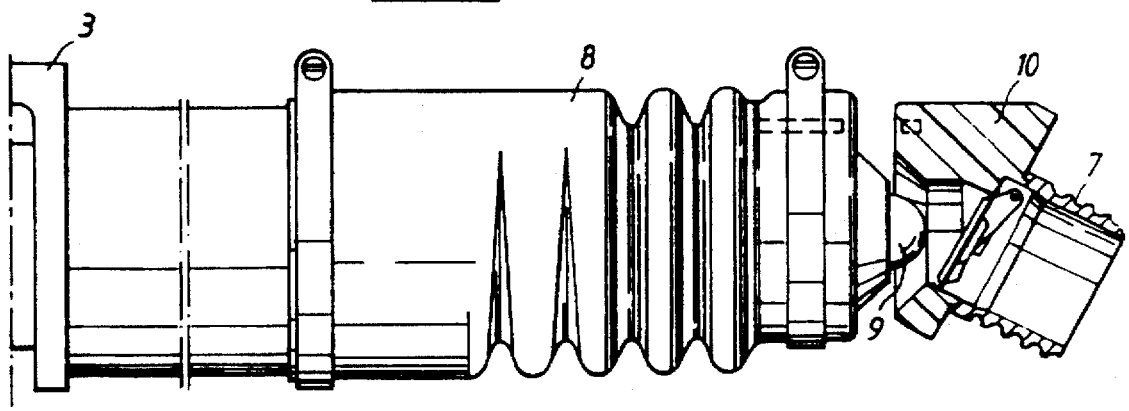
FIG. 3 illustrates the front part of a robot head belonging to said robot, and an adapter attached to the upper orifice of the vehicle fuel-tank pipe.

FIG. 3 illustrates the front part of the robot head 3 in larger scale. The robot head 3 includes an outer tube 8 and an inner tube 9 which is movable within the outer tube 8, and out of said outer tube. The outer tube 8 is arranged for docking with an adapter 10 attached to the upper orifice of the fuel-tank pipe 7. When the outer tube 8 is docked to the adapter 10, the free, forward end of the inner tube 9 is intended to be projected forwards to a position down in the tank pipe 7, whereafter fuel is delivered through the inner tube 9.

The robot head 3 also carries an opening device 11, which is shown in larger scale in FIG. 4. The opening device 11 is constructed to open a fuel-tank flap or cover 12 of vehicle 1 in response to movements carried out by the robot head 3.

According to the invention, the system includes a plurality of different transponders 13, of which only one is carried by the vehicle 1, wherein each of the transponders is provided with a simple code which the transponder is intended to modulate on a signal transmitted by the transceiver unit 14 and reflected by the transponder. FIG. 7 illustrates a transponder 13 with associated antenna, and a transceiver unit 14 and associated antenna. The transceiver unit 14 includes a decoder 15 of suitable known kind which is intended to decode the code from the signal received by the transceiver unit 14 from the transponder 13. The decoder 15 is also intended to deliver the code to a computer 23 working with the robot. The computer 23 includes a memory in which a specific movement plan for each individual code is stored. When the computer 23 receives a code from the decoder 15, the computer 23 functions to steer the robot head 3 in the movement plan belonging to the received code.

According to one preferred embodiment of the invention, each of the transponders 13 includes a modulator 16 which functions to modulate the received signal with a frequency which is specific to each transponder and which forms the aforesaid code.

In this embodiment, the decoder 15 is constructed in a known manner to detect from a number of different frequencies, namely equally as many frequencies as the number of different transponders, that frequency with which the received signal is modulated, and to deliver to the computer 23 a signal which discloses the code that belongs to the detected modulation frequency.

According to another alternative and preferred embodiment, each of the transponders 13 includes a modulator 16 and also a pulse train generator 17 which is intended to steer the modulator 16 to modulate the received signal with a pulse train which is specific to each transponder 13 and which forms said code. The communication technique described in Swedish Patent Specification No. 7503620-2 can be used advantageously with this embodiment. The pulse train may contain the relevant code in binary form, which is preferred.

It can be said generally that this type of communication technique per se is well known to the art, among other things from the aforesaid patent specifications, and consequently the technique will not be described in greater detail in this document.

The aforesaid opening device 11 includes a resilient bellows-like element 18 which is mounted for pivotal movement on a shaft 20 against a spring force exerted by a spring 19, said pivot shaft being located at right angles to the plane in which the robot head moves during an opening operation. The shaft 20 will thus normally extend vertically. In its rest position, the bellows-like element 18 extends parallel with the outer tube 8 of the robot head 3. The front, free end 21 of the bellows-like element 18 is open, whereas its other end 22 is connected to a suitable, known vacuum source, not shown.

In FIG. 4, the opening device 11 is shown in a position to which it has been brought by the robot head and in which the front end 21 of said element 18 abuts a vehicle fuel-tank flap or cover plate 12, i.e., a position in which the opening operation shall commence.

An opening and docking sequence is effected in the following way: The vehicle 1 is placed in a predetermined position in relation to the robot, although reasonable deviations from this predetermined position are allowed. The robot is then started and the transceiver unit 14 on the robot seeks the transponder 13 and the robot computer steers the robot and its robot head 3 to a position in which the antenna of the transceiver unit 14 is positioned very close to the transponder antenna. This is the starting position. The robot thereafter reads the code that is relevant on this occasion and the robot computer then converts the code into a movement plan taken by the robot computer from its memory. Subsequent thereto, the robot computer controls movement of the robot head 3 in accordance with this movement plan, in which the opening device 11 is moved to the position shown in FIG. 4 by means of the robot head 3. A reduced pressure is then generated in the bellows-like element 18, therewith causing the element to be sucked firmly to the fuel-tank cover plate 12.

The robot head 3 then continues to move in accordance with said movement plan, which is exemplified by the vectors shown in FIG. 6. The vector 140 shows that the last movement performed prior to reaching the position illustrated in FIG. 4 involved moving the robot head 3 straight towards the fuel-tank cover plate 12 through a distance of 140 millimeters, so as to bring the bellows-like element 18 into abutment with the fuel-tank cover plate 12. The robot head 3 then moves through a distance of 110 millimeters in a direction represented by the center vector, and finally through a distance of 75 millimeters straight to one side, as represented by the vector shown to the right in FIG. 6. Upon completion of this movement pattern, the position shown in FIG. 5 will have been reached and the fuel-tank cover plate 12 thus opened.

The mutual positioning of the outer tube 8 and the opening device 11 on the robot head 3 is such that the outer tube 8 will be positioned centrally opposite the adapter 10 when the position shown in FIG. 5 is reached.

The next movement carried out by the robot head 3 is to dock the outer tube 8 onto the adapter 10, whereafter the inner tube 9 is moved down into the fuel-tank pipe 7 of the vehicle 1. Fuelling is effected by delivering fuel through the inner tube 9 and down into the tank pipe 7.

When fuelling is completed, the aforesaid movement pattern is repeated in the reverse order, so as to close the tank cover plate 12 and return the robot to its original starting position.

In the case of the embodiment illustrated in FIGS. 4 and 5, the tank cover plate 12 is pivoted about a vertical shaft provided at one edge of the cover plate 12. It will be understood, however, that the movement plan stored in the computer memory may be one for opening cover plates which are pivoted about a vertical shaft and cover plates which are pivoted about a horizontal shaft or about a shaft having some other orientation.

The transponder 13 can be placed in any given position whatsoever adjacent to or on the tank cover plate 12, since after the robot head 3 has sought the transponder 13 so as to place the antennas of the communication link close together, i.e., in said starting position, the code will disclose a movement plan which causes the robot head 3 to place the opening device 11 in the position shown in FIG. 4.

It will have been understood that because the movement plan associated with respective codes is stored in the robot computer, there can be stored a large number of movement plans which will cover in practice the movement plans required for automatic refuelling of all types of vehicles.

The amount of information contained in each transponder 13 is very low, which means that the transponders can be made very simple and inexpensive to manufacture.

Although it is possible to store a movement plan for each vehicle per se, it is probable that five to fifteen different movement plans will be sufficient, because a given movement plan related to a given vehicle can be used for another vehicle. This means that only five to fifteen different transponders need be provided in order to serve essentially all types of vehicles.

According to one preferred embodiment of the invention, the transponder 13 is placed on the vehicle 1 so as to be positioned centrally opposite the transceiver antenna on the robot head 3 subsequent to having docked the robot head 3 onto the adapter 10. Thus, when the robot head 3 has completed that part of the movement plan in which docking is effected, the communication link will be in said starting position.

This embodiment is particularly preferred for vehicles which do not have a stable height position immediately after switching-off the engine. The Citroen is an example of such a vehicle. The embodiment is also beneficial to vehicles which are lowered by an extent in excess of about 2 to 3 centimeters when filling the fuel tank to its full capacity.

Because the communication link is located in its starting position after docking, the robot computer may be programmed to control the robot head during the progress of a fuelling operation in a manner to maintain said starting position, thereby causing the robot head to accompany vertical movements of the vehicle, and therewith also of the adapter. The fact that the robot head shall be controlled in the aforesaid manner is disclosed by the transponder code, which means that in addition to taking-out a given movement plan, the computer also has to take-out instructions for guiding the movements of the robot head during an ongoing refuelling operation in the aforesaid manner.

It will be evident from the aforegoing that the technique described above considerably simplifies both transponder and opening procedure in comparison with earlier known techniques.

Although the invention has been described with reference to several exemplifying embodiments thereof, it will be obvious that these embodiments can be modified by the person skilled in this art.

The present invention shall not therefore be considered restricted to the described and illustrated embodiments, since modifications and changes can be made within the scope of the following claims.

What is claimed is:

1. Apparatus for the automatic fuelling of vehicles, primarily cars, comprising: a robot which includes a robot head that is movable relative to the robot so as to enable the robot head to be brought to a predetermined position in relation to a vehicle fuel-tank pipe carried by a vehicle and including a cover flap, a positioning system which includes a transceiver unit that is mounted adjacent the robot head and operable at microwave frequency, a passive transponder positioned at a predetermined position on the vehicle, wherein the robot head includes an outer tube and an inner tube which is housed within said outer tube and movable out of said outer tube, wherein the outer tube is adapted to be docked with an adapter attached to the fuel-tank pipe, and wherein subsequent to docking said outer tube, a free forward end of the inner tube is projected to a position down in the fuel-tank pipe, whereafter fuel is delivered through the inner tube, and wherein the robot head carries a flap opening device which functions to open the cover flap in response to movements of the robot head, wherein the transponder is one of a plurality of different transponders of which only one is carried by a vehicle, wherein each transponder is provided with an individual code which the transponder is adapted to modulate on a signal transmitted by the transceiver unit and reflected by the transponder when the robot head is positioned in a predetermined position relative to the transponder, and a decoder for decoding the code from the signal received by the transceiver unit from the transponder and for delivering the decoded code to a computer connected to the robot, wherein the computer includes a memory in which a specific movement plan is stored for each of a plurality of codes, and wherein the computer is adapted to steer the robot head in the movement plan defined by the received and decoded code upon the receipt of said code in order to open the fuel-tank flap and in order to position the robot head relative to the fuel-tank pipe of the vehicle to permit the vehicle to be fuelled.

2. Apparatus according to claim 1, wherein the transponder includes a modulator which modulates the received signal with a frequency which is specific to that transponder and which provides said code.

3. Apparatus according to claim 1, wherein the transponder includes a modulator and a pulse train generator to modulate the received signal with a pulse train which is specific to that transponder and which provides said code.

4. Apparatus according to claim 1, wherein the flap opening device includes a resilient bellows-like element which is mounted on a pivot shaft for pivotal movement against the action of a spring force, said pivot shaft positioned perpendicularly to the plane in which the robot head moves during a flap opening operation, wherein in its rest position the bellows-like element extends parallel with the outer tube of the robot head, and wherein a forward, free end of the bellows-like element is open and wherein another end of said element is connected to a vacuum source.

5. Apparatus according to claim 1, wherein the transponder is positioned on the vehicle opposite an antenna of the transceiver unit when the robot head is docked with the adapter.

* * * * *